Feb. 8, 1966  R. L. PROPST  3,233,885
PANEL HAVING MULTI-DIRECTIONAL FLEXIBILITY
Original Filed Nov. 4, 1959  3 Sheets-Sheet 1

INVENTOR
ROBERT L. PROPST

BY *Price and Heneveld*

ATTORNEYS

Feb. 8, 1966   R. L. PROPST   3,233,885
PANEL HAVING MULTI-DIRECTIONAL FLEXIBILITY
Original Filed Nov. 4, 1959   3 Sheets-Sheet 2
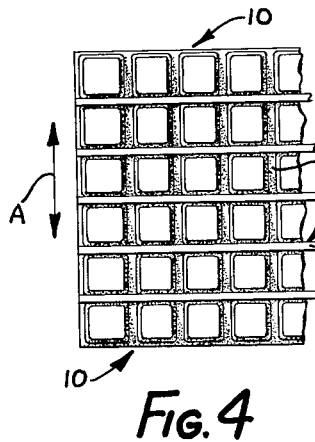
FIG. 4
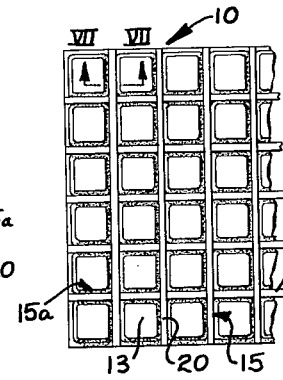
FIG. 5
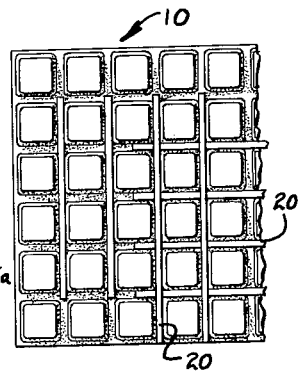
FIG. 6
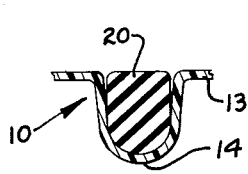
FIG. 7
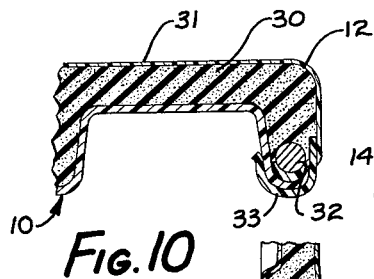
FIG. 10
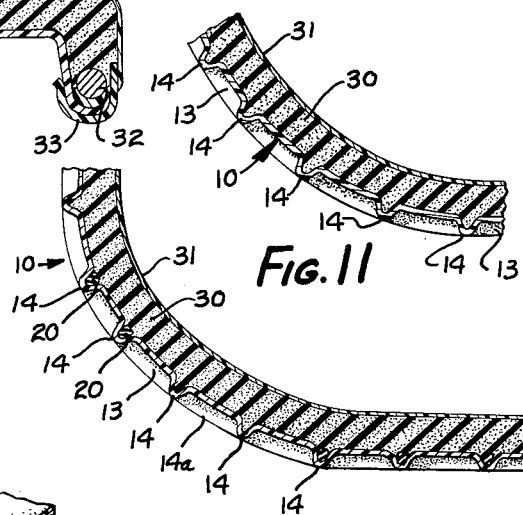
FIG. 11
FIG. 12
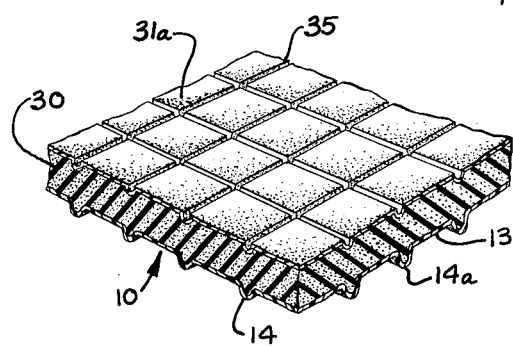
FIG. 13
INVENTOR
ROBERT L. PROPST
BY *Price and Heneveld*
ATTORNEYS Feb. 8, 1966  R. L. PROPST  3,233,885
PANEL HAVING MULTI-DIRECTIONAL FLEXIBILITY
Original Filed Nov. 4, 1959  3 Sheets-Sheet 3
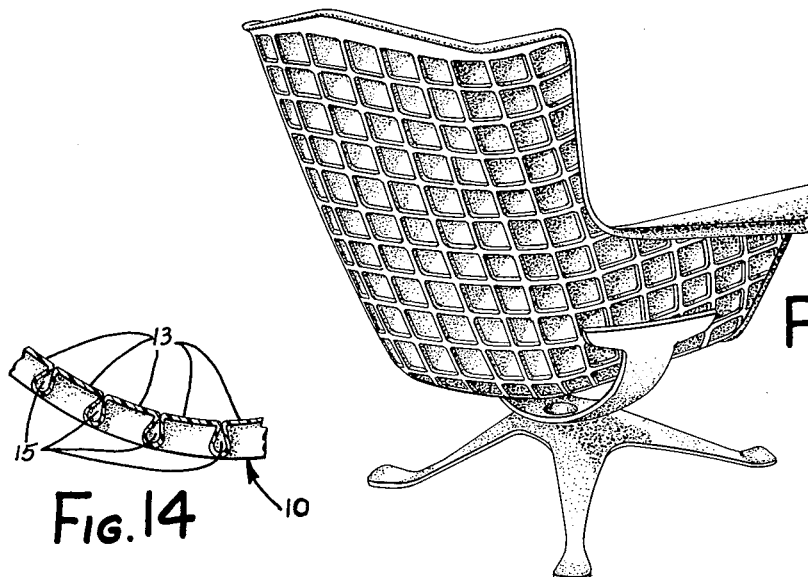
FIG. 17
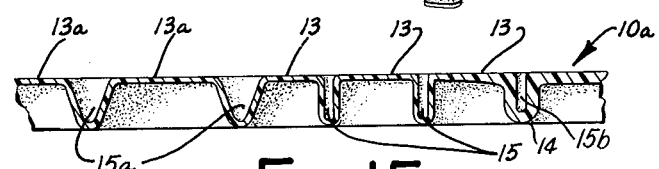
FIG. 14
FIG. 15
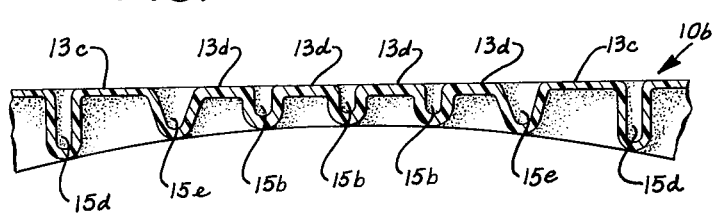
FIG. 16
FIG. 18
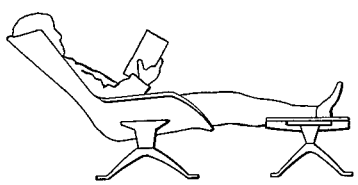
FIG. 19
INVENTOR
ROBERT L. PROPST
BY
ATTORNEYS

United States Patent Office 3,233,885
Patented Feb. 8, 1966

3,233,885
PANEL HAVING MULTI-DIRECTIONAL
FLEXIBILITY
Robert L. Propst, Ann Arbor, Mich., assignor to Herman Miller, Inc., Zeeland, Mich., a corporation of Michigan
Continuation of application Ser. No. 850,900, Nov. 4, 1959. This application June 25, 1962, Ser. No. 206,138
12 Claims. (Cl. 267—1)

This invention is concerned with the creation of a panel structure which may be mass produced for a wide variety of applications because it is characterized by a combination of high strength, adaptability to contouring into compound curvatures and controllable resiliency.

This application is a continuation of my application entitled, "Panel Having Multi-Directional Flexibility," Serial No. 850,900, filed November 4, 1959, now abandoned.

A panel having these characteristics has application in a wide variety of fields such as the manufacture of furniture, architectural installations and others. For the sake of brevity, this invention will be described as applied to furniture shells. This, however, should not be interpreted to obscure its utility or significance in other fields.

In the furniture field, the necessity of high strength panels or shells having compound curvature exists in a wide variety of applications. Heretofore, this requirement has been met by panels or shells formed in specially shaped molds capable of producing the panel in the particular curvature required. Such panels have been manufactured both from wood laminates and molded and laminated synthetic resin materials. Where the material was metal, mating dies have frequently been used. Such molds and dies are exceedingly expensive. Despite this, the resulting product has lacked certain desired characteristics. This invention provides a product having these characteristics and in many cases do so at a lower cost.

For some designs, the panel of this invention may be mass-produced as a basic material. In such cases a material reduction in tooling costs per unit of production may be realized. Such has not heretofore been possible in molded shell constructions.

Some designs will require the panel of this invention to be specially molded for the particular design. This, of course, will eliminate some, or a major portion, of the economies otherwise obtainable through mass production of a panel of constant characteristics. However, a large number of designs are adapted to utilize mass produced panels, obtaining the benefit of maximum manufacturing economies.

Particularly in the furniture field, the characteristic of resiliency is essential. However, this resiliency must be combined with high strength if the product is to be durable. Particularly where the shell is to be applied to a chair, it is normally necessary that the chair shell, as a whole, be resilient so that it does not provide zones of high resistance to the user's body because such zones are exceedingly uncomfortable. Further, it should be capable of controlled and limited flexing so that it may, to a limited degree, conform to the user's body to afford proper comfort. When this is done, the necessity for thick or deep padding, frequently referred to in the furniture field as overstuffing, is eliminated because such padding is used only as a means of cushioning the irregular contours of the human body from the rigid inflexibility of conventional furniture structures. Normally, furniture utilizing this invention will require only a thin, resilient pad. The pad need only have sufficient thickness to give a slight softness to the surface rather than the depth necessary to eliminate basically rigid inflexibility of the furniture structure as a whole.

The characteristic of flexibility has another important result. Flexible panels inherently distribute the stress loads in the panels, eliminating zones of stress concentration. This uniformity of stress distribution permits a panel of thinner material and lighter weight to be applied under a given load condition without sacrifice in the overall strength and durability of the end product. This not only reduces costs but adds to the useful life of the product.

This invention gives flexibility control either throughout the entire panel or in selected zones or areas. The former has been accomplished in previous products to a very limited degree but the latter has not heretofore been practical in any construction. In this invention this control may be effected either in the manufacture of the panel itself or later by restricting the action of the hinges between the incremental areas or pans. The former method is most applicable to panels specially molded for their particular application. In either case, the ability to control resiliency either as a whole or in selected areas of the panel is a marked advance in the various fields to which this invention may be applied. It is especially so in the furniture field.

In applications for which the panel is mass produced, this invention permits the panel to be fabricated and the control of the resiliency of the panel to be varied to fit its selected use at the point of application of the panel to the product. Thus, a panel of uniform design may be varied to have a wide variety of resiliency either throughout the entire panel or in selected areas depending upon the use to which the panel is to be put. In such cases, this leads to a very important economy in the use of this invention. A single panel design which may be mass-produced can be readily and economically adapted to a wide variety of applications at a low cost. Thus, among other savings arising from this invention, is the spreading of the amortization of the molding dies over a much greater volume of production. Further, the dies may be used to capacity because the resulting product is not specialized to a single use.

Further, this invention permits the resiliency of the panel to be eliminated after a predetermined degree of deflection has been obtained. In other words, the mechanism producing the resiliency can be made to lock up after the desired degree of deflection has occurred.

These and other objects and advantages of this invention will be immediately understood by those who work with the problem of curved panels or shells upon reading the following specification and the accompanying drawings.

In the drawings:

FIG. 4 is a plan view of a panel incorporating this invention showing the application of resiliency control in a single direction;

FIG. 5 illustrates the panel with bi-direction resiliency control;

FIG. 6 shows the panel with resiliency control in a selected zone;

FIG. 7 is a fragmentary, enlarged, elevational, sectional view taken along the plane VII—VII of FIG. 5;

FIG. 10 is an enlarged, fragmentary, sectional view showing one means of anchoring a covering to the panel of this invention;

FIG. 11 is a fragmentary, sectional, elevational view of the panel of this invention curved to a selected contour;

FIG. 12 is a view similar to FIG. 11 except it illustrates the application of resiliency control to selected areas of the panel;

FIG. 13 is an enlarged, oblique, fragmentary view of a modified form of applying a fabric in resilient covering to the panel of this invention;

FIG. 14 is an enlarged, fragmentary, sectional view of this panel deflected to produce a locked up condition;

FIG. 15 is an enlarged, fragmentary, sectional view of a modified construction for the panel of this invention;

FIG. 16 is an enlarged, fragmentary, sectional view of a further modified construction for the panel of this invention;

FIG. 17 is an oblique view of this panel applied to a chair shell of compound curvature;

FIG. 18 is a schematic view of the chair illustrated in FIG. 17 with the chair in normal position; and FIG. 19 is a schematic view of the chair illustrated in FIG. 17 but showing the resiliency of the panel structure.

Basically, this invention consists of a panel of indeterminate width and length, this being limited by the use to which it is to be put and the capacity of the equipment used to fabricate it. The panel might be best described as having a waffle pattern since it is composed of a plurality of depressed flat areas separated from each other on all sides by narrow, continuous ridges. The opposite face of the panel is characterized by a plurality of flat areas separated from each other on all sides by narrow channels. The flat areas act as structural supports while the apices of the ridges act as hinges. Since the ridges are arranged in at least two groups which intercept each other, the hinges may be used to contour the panel in one or more directions.

Figure 1:
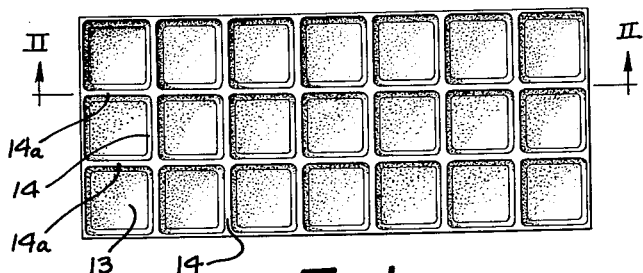
FIG. 1 is a plan view of a panel incorporating this invention.
Figure 2:
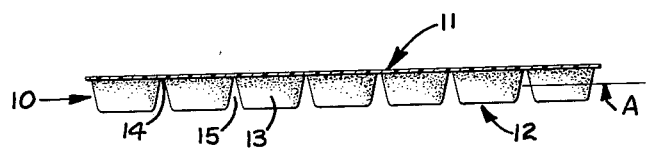
FIG. 2 is a sectional elevation view taken along the plane II—II of FIG. 1.
Figure 3:
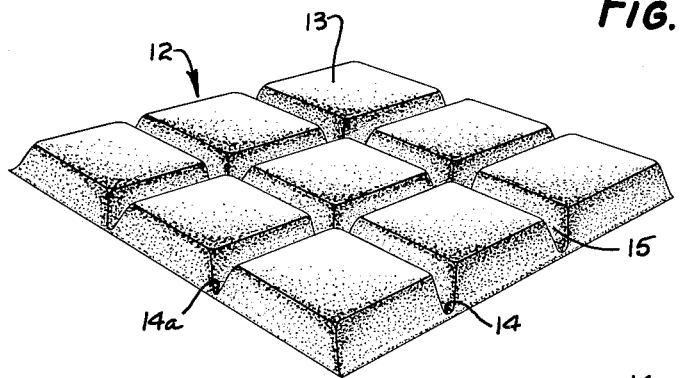
FIG. 3 is a fragmentary, oblique view of the panel illustrated in FIG. 1 but inverted.

Referring specifically to FIGS. 1, 2 and 3 of the drawings, it will be seen that the panel 10, as manufactured, consists of a sheet having a pair of faces 11 and 12. These faces are spaced apart a significant distance thus characterizing the panel with a structurally important thickness. This spacing must be such that the axis A of neutral stress (FIG. 2) is substantially spaced from both faces at all times. Without this, the panel cross sectionally will not function, when fully loaded, as an I-beam to form a structural member. The panel is characterized by a plurality of flat bottomed pans 13 arranged in a geometric pattern. Each of the pans 13 is surrounded by a raised ridge or hinge 14. The hinges 14 are arranged in at least two groups, the hinges of one group 14 intersecting with the hinges 14a of the other group. The outer surface of the apices of the hinges 14 are arranged in a common plane which forms the face 11 of the panel 10.

The outer face of the bottoms of the pans are also arranged in a common plane and collectively constitute the other face 12 of the panel. The bottoms of the pans are flat and collectively have an area, substantially greater than a major portion of the total area of the face 12. The flat bottomed areas formed by the pans on the face 12 are separated on all sides from each other by deep, narrow channels 15 which constitute the inside or depression formed by the hinges 14 and 14a.

Within the principles of this invention, some latitude of design is permissible in choosing the proportion of area of face 12 assigned to the bottom of the pans 13 and to the channels 15 of the hinges 14 and 14a. However, it is important that the bottoms of the pans, when reinforced by the sides of the channels, be rigid and capable of resisting any tendency to buckle when the panel is contoured and placed under the expected working load. Thus, the relationship between the width of the channels 15 and the marginal dimensions of the bottoms of the pans measured on the face 12 will be selected for a particular application on the basis of several factors. These factors will include the wall thickness and characteristics of the material from which the panel is molded. It will, to some extent, be dictated by the degree of contour which is to be given to the panel. It will also, in part, be determined by the spacing between the faces 11 and 12. This spacing will, in part, determine the flexibility of the panel. The greater this spacing, the more flexible the panel since the greater is the moment arm about which the hinges are operated. However, in all instances the depths of the channels must be such that all flexing of the panels occurs either at the apex of the hinges or in the sides of the channels and even where there is some flexing of the side walls of the channels, it must be a very minor portion of the total flexing.

When the panel is flexed so that the face 12 is on the inside or concave side of the curvature, the bottoms of the pans 13 become the compression members of an I-beam like structure and the apices of the hinges 14 and 14a become the tension members of the I-beam like structure. The sides of the channels are then basically in shear. In this application, the apices of the channels form a network of strong, continuous, tension members throughout the panel since they are continuous in both directions and, therefore, form uninterrupted means of supporting tension loads.

The flexibility of the panel can be controlled in a number of different ways, all of which, however, effect control by varying the action of the hinges. Where the flexibility is to be controlled by the characteristics of the panel as molded or otherwise fabricated, this can be effected by varying the depth or width of the channels. It can also be done by changing the slope of the channel walls. The size and shape of the pans may be varied. The thickness and inherent stiffness of the material can be varied. It will be obvious that increasing the depth of the channels will increase the moment arm of the bending loads applied to the hinges. This will increase the flexibility of the panel. Varying the width of the channels will increase the effective radius of the hinges thereby making them easier to actuate.

Flexibility may also be limited by the "lock-up" feature of this panel. "Lock-up" may be functionally defined as the degree of contour applied to the panel necessary to close the open faces of the channels between the pans. "Lock-up" occurs when the open face of a channel is closed and the adjacent pans abut each other to form a continuous, rigid compression beam. At this point further flexing of the panel cannot occur. This feature is illustrated in FIG. 14 in which the bottoms of the pans 13 are shown in abutting relationship closing the open faces of the channels 15. The point at which lock-up will occur may be controlled by the width of the channels or the slope of the channel walls. Both expedients determine the width of the gap which must be closed before lock-up occurs. The lock-up feature of this invention is highly significant. Many times it is desirable to have flexing until a predetermined degree of deflection has occurred and thereafter to limit or completely eliminate further deflection. This invention accomplishes this. An example of such a situation is a cushion in which initial deflection is necessary to permit shaping to the user's anatomy but once this has been accomplished high resistance is necessary to provide firm and comfortable support.

Where the panel is fabricated for a particular operation, the flexibility and point of lock-up can be varied from one zone to another throughout the panel. Thus in some areas of such a panel the width of the channels may be increased or decreased and their depth may be changed. Even the thickness of the material itself may be varied.

Such an arrangement is illustrated in FIG. 15. Here the panel 10a has pans 13 of one size and pans 13a of a larger size. Certain of the channels 15 are narrow and deep. These will flex readily but will lock-up when only a small degree of curvature has been given to the panel. The channels 15a are wider which will not materially affect the flexibility of the panel but will allow substantially greater deflection before lock-up occurs. On the other hand, the wall thickness of the material around the channel 15b is substantially increased. Since the channel 15b has the same width as channel 15, lock-up will occur at the same degree of deflection. However, the increased material thickness will materially restrict the flexing of the hinge 14 thus stiffening the panel and requiring a greater loading to produce a predetermined amount of panel deflection.

It will also be understood that by varying the width and depth of the channels and the wall thickness of the material in selected areas of a panel, zonal control of panel deflection can be effected. Such an arrangement is illustrated by panel 10b in FIG. 16. In the panel 10b the wall thickness of the material for the pans 13c is less than that of the pans 13d. Also, the depth of the channels 15b is less than that of either the channels 15e or 15a. Obviously deflection will occur more rapidly about the hinges of the channels 15d. This in turn will largely control the contour assumed by the panel under operating loads. This is very desirable in many applications such as springs for cushions.

Where the panel is mass-produced to initial characteristics uniform throughout, the flexibility of the panel either as a whole or in selected zones can be adjusted as circumstances require. FIGS. 4 through 7 illustrate a means of accomplishing this purpose. To reduce the flexibility of the panel, a snubber strip 20 is inserted in the channels 15 of the hinges 14. The snubber strip normally is of a compressible, resilient material. The degree to which it restricts the flexibility of the panel will be determined by the hardness or durometer characteristics of the material used for these strips. Thus, the higher the durometer or stiffness of the material, the greater the restriction. It will be obvious that these strips may be used to decrease the degree of deflection at which lock-up will occur. The snubber strips 20 fills the channels 15 and preferably are bonded to the inside faces of the channel to retain them in place and prevent them from working out of the channel as the panel is flexed. Resilient materials such as natural or synthetic rubber are particularly adapted for use as snubber strips. Other solid elastomerics may be used such as the polyurethanes.

FIG. 4 illustrates the use of the snubber strips 20 for monodirectional control of the flexibility of the panel. In this case, the snubber strips 20 are applied only to the channels 15a. Thus, the resiliency of the panel will be restricted only in the direction indicated by the arrows A. FIG. 5 shows the snubber strips utilized to control flexibility in both directions. In this case the snubber strips are applied to both the channels 15 and 15a. To do this, the snubber strips preferably are continuous along either the channels 15 and 15a and consits of short strips, one beside each of the pans 13 in the case of the channels of the other group.

FIG. 6 illustrates the application of the snubber strips to effect zonal or area flexibility restriction. In this case, portions of both of the groups or channels 15 and 15a are filled with snubber strips 20. This type of application could be used for a number of purposes such as controlling the curvature of the panel as it is bent to shape or to control the deflection of the panel under loading conditions. This latter would be particularly true where certain areas of the panel are to be subjected to concentrated loads as is true in the case of the seat of a chair.

FIGS. 10, 11 and 12 illustrate how the panel may be treated to provide a finished or cushioned surface. As shown in FIG. 10, the panel 10 has a layer of foam 30 applied to the face 12. This foam may either be a sheet of material which is suitably bonded to the face 12 or preferably a thin layer of foam which is formed in place. For this purpose the foam must be of a resilient type such as a foamed polyvinyl chloride or one of the resilient polyurethane foams. The selection of the particular material for the foamed pad 30 is of no significance so far as this invention is concerned because it relates only to the end use of the panel rather than to the panel as a basic shell material. The foam is preferably covered and protected by an exterior covering material such as a fabric 31. Again, this fabric may be of any suitable type such as a woven material of either natural or synthetic fibers or it may be a reinforced polyvinyl chloride. The edge of the fabric is secured to a marginal beading wire 32 which in turn is clipped to the edge of the panel by the anchor clip 33. The anchor clip 33 may be secured to the wire 32 or bonded to the fabric. Again, these details are presented merely as illustrative background and are not part of the invention per se.

FIG. 11 illustrates the panel padded and covered as shown in FIG. 10 when it has been bent to a selected contour without the use of the snubber strips 20. FIG. 12 shows the use of the snubber strips in controlling the contouring of the panel. In this case it will be noted that the channels 15 in which the snubber strips 20 have been applied are held substantially open, restricting the activity of the related hinges. However, in the area of maximum curvature the snubber strips have been omitted and it will be noted that the hinges are, to a marked degree, more closed, thus permitting a more pronounced curvature of the panel. The snubber strips are effective flexibility or contour control means since the pans between the hinges are rigid areas. Contouring of the panel is effected through a plurality of bends in the panel, each occurring only at one of the hinges 14. Thus, by the simple expedient of controlling the operation of the hinges the contouring of the panel can be regulated closely.

In the construction illustrated in FIG. 12, instead of leaving the channels in the zone of maximum contour void, so far as snubber strips are concerned, the operation of the hinges of these channels may be regulated by using a snubber strip of softer or more compressible material than the snubber strips used in those channels in which a greater restriction of flexibility is desired. Thus, by combining snubber strips of various densities and hardness, the flexibility of this panel can be adjusted and controlled accurately through a wide range with the degree of control pre-selected for each particular area, depending upon the particular characteristics desired. This entire flexibility control may be accomplished at the point of use, eliminating the problem of fabricating it into the panel at its point of manufacture.

FIG. 13 illustrates the same type of construction as shown in FIGS. 11 and 12 so far as padding and the basic shell panel 10 are concerned. However, the cover 31a is characterized by a plurality of shallow grooves 35 arranged in intersecting groups giving the surface a textured appearance. This arrangement permits the surface padding to flex under operating conditions such as occurs when the foam pad 30 is squeezed by a person sitting on it and returns to its original extended position when the chair is vacated. The use of the cross hatching grooves 35 prevents the surface material or covering from acquiring a wrinkled appearance due to this flexing. This is also desirable where the shell is designed to provide a high degree of flexibility such as suggested by the deflection of the back of the chair illustrated in FIGS. 17, 18 and 10.

It will also be understood that the ratio of thickness of the panel to the foam cushioning, as illustrated, is not to be considered as limiting. The thickness of the foam cushioning may be substantially increased or decreased. The thickness for normal application has been somewhat exaggerated to improve the readability of the drawings.

Figure 8:
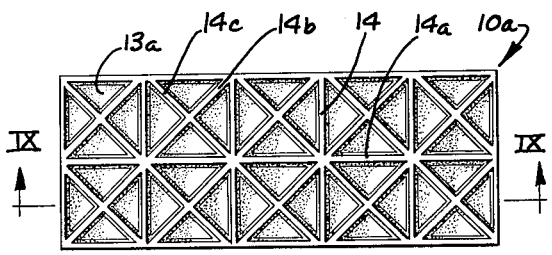
FIG. 8 is a plan view of a panel incorporating a modified arrangement for this invention.
Figure 9:
FIG. 9 is a sectional elevational view taken along the plane IX—IX of FIG. 8.

While this invention has been described in terms of a panel having a plurality of square pans 13, it is entirely possible that other geometric configurations may be applied to the pans. As illustrated in FIGS. 8 and 9, the pans 13a may be made triangular by the use of four groups of hinges, as for example, the hinges 14, 14a, 14b and 14c. It is important that the hinges of each group be parallel so that the panel 10a will be permitted to bend without creating zones of high resistance which could cause overloading of the panel structure. Again, particular deflection and stiffness characteristics may be produced by varying the size and proportion of the pans. For example, rectangular pans of long narrow configuration will result in a panel of greater flexibility in one direction than the other.

The panel itself may be manufactured from any of a number of suitable materials. Preferably it is molded from synthetic resins either with or without reinforcing materials. For this purpose it may be formed between mating dies or between a die and a pressure blanket or it may be vacuum drawn into a suitable die. It is entirely feasible that other methods may be applied to its manufacture. The panel may be manufactured on a substantially continuous basis, adapting it to mass production. This is desirable because the panel by its very characteristics has a wide variety of applications under varying circumstances, even though the basic panel, as fabricated, is of identical characteristics for all applications. Thus, its manufacture should be considered in the category of the fabrication of a basic stock material which may, as required, be re-worked subsequently to give it the particular characteristics required for its particular application.

It is also possible to fabricate separately each panel for a particular application. In such an arrangement, the panel would be fabricated as a flat material but having the desired peripheral shape. In this arrangement the edges could be specially shaped to afford a more finished appearance and to have greater strength. Though this arrangement loses some of the benefits of mass production, the fact that the panel will still be molded as a flat element rather than in the form of its final compound curvature will afford substantial economies. It will also permit adjustment of this curvature in the final product from time to time without necessitating costly die rework.

As an example of materials suitable for the manufacture of the panel 10, a blend of synthetic rubber and thermoplastic resins may be utilized such as that sold under the name of "Royalite" by United States Rubber Co. Various types of polyesters reinforced with fibrous materials such as filamentary glass or nylon can be satisfactorily used. Various other materials can be used for this purpose and the materials recited above are to be considered as exemplary only and not to be a limitation upon the scope of this invention.

In the functioning of this invention, each of the pans constitutes an incremental area of rigidity surrounded by hinges. This is the basis upon which the panel functions. The incremental areas give the panel strength and because of their shape as a pan a significant moment of inertia. They are too small in relation to their depth to wrinkle or twist under shear loading. Thus, this invention provides a structure panel of sufficient thickness to have a significant moment of inertia yet one capable of compound curvature without formation of shear wrinkles. This latter is a very significant characteristic of the panel of this invention.

It will be obvious that this invention solves a particularly serious problem. It provides a universal base or stock material in panel form which may be mass-produced and yet applied to a wide variety of products demanding a combination of high strength flexibility and significant compound curvature. Even in those applications where it is necessary to specially fabricate the panel for the particular use, the panel normally can be fabricated as a flat element and contoured later. This materially reduces die cost and facilitates lay up in and removal from the mold, die or other fabricating means. Thus, the full benefits of an integral molded shell material may be obtained by a wide variety of products in a number of fields of which furniture is only one which heretofore have had to be manufactured from materials and by methods long recognized to be markedly inferior to the integral shell type of material simply because it was economically not feasible to utilize such materials. Thus, this invention materially advances the field of molded shell materials and makes it available to a wide variety of products from which it has heretofore been foreclosed. For example, this invention makes an ideal architectural wall panel where at least sufficient rigidity is required to be self-supporting and curvature in one or more planes is desired.

While a preferred embodiment of this invention has been disclosed together with certain modifications thereof, it will be recognized that various modifications of this invention may be made without departing from the principles thereof. Such modifications are to be considered as included in the hereinafter appended claims unless these claims by their language expressly state otherwise.

I claim:

1. A unit for supporting a person in a seated position or the like, including a panel having multi-directional flexibility, said panel having a pair of spaced surfaces; a plurality of first areas collectively forming one of said surfaces of said panel; said first areas being separated one from the other on all sides by troughs; the floors of said troughs having an aggregate area substantially less than that of said first areas; said floors collectively forming the other surface of said panel; said troughs forming bendable hinges between said first areas whereby said panel may be flexed in multiple directions, the closing of said troughs defining the limit of said flexing and a frame means receiving and supporting said panel such that said one surface provides a seating area.

2. A unit as defined in claim 1, at least certain of said troughs including a compressible resilient material therein.

3. A unit as defined in claim 2, said compressible resilient material extending into said troughs of a thickness forming a pad over said one surface.

4. A unit as defined in claim 1, said troughs being staggered in predetermined positions in accordance with loads said unit is to receive.

5. A unit for supporting a person in a seated position or the like, including a panel having multi-directional flexibility, said panel having a pair of spaced parallel faces; a plurality of incremental areas collectively forming one of said faces of said panel; said incremental areas being separated from each other on all sides by narrow generally U-shaped hinges and their aggregate area being substantially greater than a major portion of the total area of the panel; the apices of said hinges collectively forming the other face of said panel; said hinges being arranged in intersecting groups; the apices of said hinges being bendable whereby said panel may be curved in one or more directions without distortion of said incremental areas; and a frame means receiving and supporting said panel such that said one surface provides a seating area.

6. A unit as defined in claim 5, at least certain of said hinges including a compressible resilient material therein.

7. A unit as defined in claim 6, said compressible resilient material extending into said troughs of a thickness forming a pad over said one surface.

8. A unit as defined in claim 5, said hinges being staggered in a predetermined position in accordance with loads said unit is to receive.

9. A unit for supporting a person in a seated position or the like, including a panel having multi-directional flexibility, said panel having a pair of spaced parallel faces; a plurality of recesses in said panel each having a flat bottom; the bottoms of said recesses collectively forming one of said faces, and their aggregate area being substantially greater than a major portion of the total area of the panel; said recesses being separated from each other by narrow U-shaped ridges, the crowns of said ridges collectively forming the other of said faces; said ridges being arranged in at least two groups with all ridges in each group being parallel to each other; the ridges of one group intersecting the ridges of the other group; the crowns of said ridges being bendable whereby said panel may be curved in one or more directions without distortion of the bottoms aid said recesses; and a frame means receiving and supporting said panel such that said one surface provides a seating area.

10. A unit as defined in claim 9, at least certain of said recesses including a compressible resilient material therein.

11. A unit as defined in claim 10, said compressible resilient material extending into said troughs of a thickness forming a pad over said one surface.

12. A unit as defined in claim 9, said recesses being staggered in a predetermined position in accordance with loads said unit is to receive.

References Cited by the Examiner

UNITED STATES PATENTS

| 2,320,425 | 6/1943 | Glaes et al. | 161—159 |
| 2,433,211 | 9/1947 | Gits | 62—108.5 |
| 3,011,602 | 12/1961 | Ensrud et al. | 161—131 |
| 3,016,317 | 6/1962 | Brunner | 161—121 XR |

FOREIGN PATENTS 551,733  3/1943  Great Britain.

EARL M. BERGERT, *Primary Examiner.*